US007159050B2

(12) United States Patent
Miyata et al.

(10) Patent No.: US 7,159,050 B2
(45) Date of Patent: Jan. 2, 2007

(54) FILE INPUT/OUTPUT CONTROL DEVICE AND METHOD FOR THE SAME

(75) Inventors: Kenichi Miyata, Kiyose (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 10/876,647

(22) Filed: Jun. 28, 2004

(65) Prior Publication Data

US 2005/0165972 A1 Jul. 28, 2005

(30) Foreign Application Priority Data

Jan. 27, 2004 (JP) ............................. 2004-018112

(51) Int. Cl.
- *G06F 13/00* (2006.01)
- *G06F 13/14* (2006.01)
- *G06F 12/00* (2006.01)
- *G06F 17/30* (2006.01)
- *G06F 3/00* (2006.01)

(52) U.S. Cl. .................... 710/33; 710/38; 711/114; 707/201; 707/202

(58) Field of Classification Search ............ 707/2, 707/9, 10, 100–102, 104.1, 200–206; 711/100, 711/111–114, 148–156, 161–165, 170–173; 713/150, 153, 200, 201; 710/1, 5, 6, 30, 710/31, 33, 34, 36, 38, 62, 72, 74
See application file for complete search history.

(56) References Cited

U.S. PATENT DOCUMENTS

| | | | |
|---|---|---|---|
| 5,555,404 A | 9/1996 | Torbjornsen et al. | |
| 5,819,290 A | 10/1998 | Fujita | |
| 6,189,017 B1 | 2/2001 | Ronstrom et al. | |
| 6,529,995 B1 * | 3/2003 | Shepherd | 711/114 |
| 6,757,699 B1 | 6/2004 | Lowry | |
| 2002/0138504 A1 | 9/2002 | Yano et al. | |

(Continued)

FOREIGN PATENT DOCUMENTS

JP  2000-59355  2/2000

(Continued)

OTHER PUBLICATIONS

Charles M. Kozierok, Apr. 17, 2001, The PC Guide, Version 2.2.0, p. 1.*

(Continued)

*Primary Examiner*—Kim Huynh
*Assistant Examiner*—Joshua D. Schneider
(74) *Attorney, Agent, or Firm*—Mattingly, Stanger, Malur & Brundidge, P.C.

(57) ABSTRACT

In a technology for dividing a file into a plurality of fragments which are distributed to a plurality of storage devices, to maintain a high level of security and fault tolerance, while storing the file on fewer storage devices than in the past.

A file input/output control device 200, upon receiving a file from a client 100, constructs a plurality of fragments from a file with reference to a predetermined number of divisions and redundancy. A file input/output control device 200 allows a plurality of fragments to be stored on a single storage device, but distributes fragments to storage devices 300 in such a way as to avoid sending a single type of fragment to any one storage device, and to avoid sending all types of fragments to any one storage device. By so doing, file input/output control device 200 ensures security against cracking and system fault tolerance, while enabling files to be stored on fewer storage devices than in the past.

11 Claims, 8 Drawing Sheets

U.S. PATENT DOCUMENTS

| | | |
|---|---|---|
| 2002/0162047 A1* | 10/2002 | Peters et al. .................... 714/5 |
| 2003/0188153 A1 | 10/2003 | Demoff et al. |
| 2003/0208693 A1 | 11/2003 | Yoshida |
| 2004/0049700 A1 | 3/2004 | Yoshida |
| 2004/0064633 A1 | 4/2004 | Oota |
| 2005/0055521 A1 | 3/2005 | Salka |

OTHER PUBLICATIONS

J. Wylie, et al., "Survivable Information Storage Systems", Computer, US, IEEE Computer Society, Aug. 2000, pp. 61-68.

* cited by examiner

Fig.3

FRAGMENT DIVISION SETTINGS SCREEN

| FRAGMENT DIVISION SETTINGS DIALOG | |
|---|---|
| FRAGMENT DIVISION NUMBER | 10 |
| REDUNDANCY | 2 |
| ACTION WHEN DIVISION IMPOSSIBLE | ○ RETURN ERROR TO CLIENT<br>⦿ NOTIFY ADMIN WITHOUT DIVIDING<br>E-Mail administrator@localdomain |

Fig.4

FRAGMENT STRUCTURE

| FRAGMENT IDENTIFIER | DATA PROPER |
|---|---|

Fig.5

STORAGE SYSTEM MANAGEMENT TABLE

| STORAGE DEVICE | FRAGMENT IDENTIFIER | |
|---|---|---|
| ST1 | ID1 | ID3 |
| ST2 | ID1 | ID4 |
| ST3 | ID2 | ID3 |
| ST4 | ID2 | ID4 |

Fig.6

DISTRIBUTION TABLE

~ DT

| FILE IDENTIFIER | FRAGMENT IDENTIFIER | STORAGE DEVICE | |
|---|---|---|---|
| 100001 | ID1 | ST1 | ST2 |
|  | ID2 | ST3 | ST4 |
|  | ID3 | ST1 | ST3 |
|  | ID4 | ST2 | ST4 |
| 100002 | ID5 | ST1 | ST2 |
| 101001 | ID9 | ST1 | ST2 |

FILE INPUT/OUTPUT CONTROL DEVICE AND METHOD FOR THE SAME

BACKGROUND

The present invention relates to a technique for dividing a file and storing it in a plurality of storage devices.

In the field of storage technologies, there are known, for example, a technology called striping, and a technology involves dividing one set of data into a number of fragments, which divided fragments are then distributed to a number of storage devices for storage. Literature describing the latter technology includes "Survivable Information Storage Systems", COMPUTER, (US), IEEE COMPUTER SOCIETY, August 2000.

According to technologies of this kind, since data is fragmented, if any of the storage devices should be cracked, it will nevertheless be difficult to reconstruct the original data, thereby providing improved security.

However, with the conventional technology described above, a considerable number of storage devices are needed, depending on the number of fragments into which a file is divided. Thus, when a large number of fragments are used in order to enhance security, there is a commensurate increase in the number of storage devices required, and costs are entailed thereby. Another issue with the conventional technology described above is that if even a single storage device should experience a fault, it becomes impossible to reconstruct the data.

SUMMARY

With the foregoing in view, a technique for dividing a file into fragments and storing them in a plurality of storage devices is provided, fragments can be stored using a smaller number of storage devices than in the past, while maintaining a high level of security and fault tolerance.

On the basis of this issue, the file input/output control device of the present invention is constituted as follows. It essentially resides in a file input/output control device for controlling input/output of a file to and from a plurality of storage devices connected by predetermined information transmission unit, the device comprising a fragment unit for constructing a plurality of fragments from said file according to a predetermined number of divisions n (n is an integer $\geq 2$) such that each fragment derived by the division has a predetermined redundancy r (r is an integer $\geq 2$); and a fragment output unit for outputting the constructed fragments to said storage devices, in such a way as to allow a plurality of fragments to be stored on any one storage device while avoiding storing fragments of the same type on any one storage device, and while avoiding storing fragments of all types on any one storage device.

According to the file input/output control device of the present invention, since a plurality of fragments can be output to any one storage device, fragments can be preserved with a smaller number of storage devices than in the past. Furthermore, since in no event are fragments of all types output to any one storage device, it will not possible to reconstitute the file, even if fragments should be stolen through unauthorized access of a storage device. Accordingly, security against cracking and the like can be enhanced. Additionally, since fragments contain redundancy and are output in a distributed manner to a plurality of storage devices, in the event of a fault in a storage device, it will nevertheless be possible to read out the fragment from the other storage devices, as long as the number of faulty devices is less than the redundancy r. Thus, the fault tolerance of the storage system can be improved.

The fragment unit may, for example, construct the plurality of fragments by means of replicating each fragment after dividing files; or construct the plurality of fragments by means of replicating files, and then dividing each file.

The fragment output unit may output said fragments to a number m (m is an integer) of storage devices fulfilling the relationship:

$$m \geq nr/(n-1).$$

Using this computational equation, it is possible for a storage system administrator to readily ascertain the minimum number of storage devices needed for a given number of divisions n and redundancy r.

The file input/output control device may further comprise an identifier assigning unit for assigning to each said fragment a unique fragment identifier depending on the type of said fragment; and a distribution memory unit for storing said fragment identifier in association with the storage device which is the destination of the fragment corresponding to said fragment identifier. With this arrangement, it is a simple matter for the file input/output control device to ascertain the destination of each fragment.

The file input/output control device may further comprise a fragment input unit for inputting fragments of all types from said storage devices; and a file reconstruction unit for reconstructing said file from said fragments of all types.

By means of such an arrangement, the file input/output control device can reconstruct a file that has previously been divided into a plurality of fragments. Here, where the file input/output control device comprises the aforementioned distribution memory unit, the file input/output control device will be able to readily select a storage device for input of each fragment, by making reference to the distribution memory unit.

In the aforementioned file input/output control device, of a plurality of storage devices storing a fragment of the same type, said fragment input unit may input said fragment from the storage device having the shortest transmission time to said file input/output control device.

By so doing, it is possible to rapidly input each fragment. Shortest transmission time may be determined, for example, by issuing a "Ping" command to each storage device in order to measure response time of each storage device, or by measuring the number of routers between devices by means of a "Tracert" command or the like, and determining the transmission path with the most routers as having the longest transmission time. The time required for transmission may be pre-registered within the file input/output control device, or measured each time that fragments are input.

In the aforementioned file input/output control device, said fragment input unit, in the event of being unable to input one fragment, may make reference to said distribution memory unit to input said one fragment from another storage device having said one fragment stored therein.

The file input/output control device may further comprise an encryption unit for performing encryption of said file prior to generation of said fragments by said fragment unit, or an encryption unit for performing encryption of said fragments. By so doing, even if fragments should be stolen through unauthorized access of a storage device, the contents thereof can be kept secret.

The file may be given a file identifier, and the file input/output control device may further comprise an encryption unit that uses said file identifier as key information to perform encryption of at least said file or said fragments. By so doing, it is unnecessary to separately generate key information, so that encoding can be carried out readily. The file identifier may consist of a file name or the like, for example. As the encoding method, DES, RC2, RC4 or the like could be used.

The various embodiments of the invention described hereinabove may be implemented in combination or in part, as appropriate. The invention may also take the form of a method whereby a computer performs control of file input/output of a file to and from a plurality of storage devices connected by predetermined information transmission system; or a program for causing a computer to perform control of file input/output of a file to and from a plurality of storage devices connected by predetermined information transmission system.

The computer program may take the form of a computer data signal embodied in a carrier wave. It may also be recorded on a computer readable recording medium. Recording media include, for example, various media such as flexible disks, CD-ROM, DVD-ROM, magneto-optical discs, memory cards, hard disks, and the like.

BRIEF DESCRIPTION OF THE DRAWINGS

FIG. 3 illustrates an exemplary GUI for setting number of divisions and redundancy;

FIG. 4 illustrates the structure of a fragment assigned an identifier;

FIG. 5 illustrates an exemplary storage system management table;

FIG. 6 illustrates an exemplary distribution table;

DESCRIPTION OF THE PREFERRED EMBODIMENTS

The preferred embodiments of the invention are described hereinbelow through specific examples, in the following order.

Figure 1:
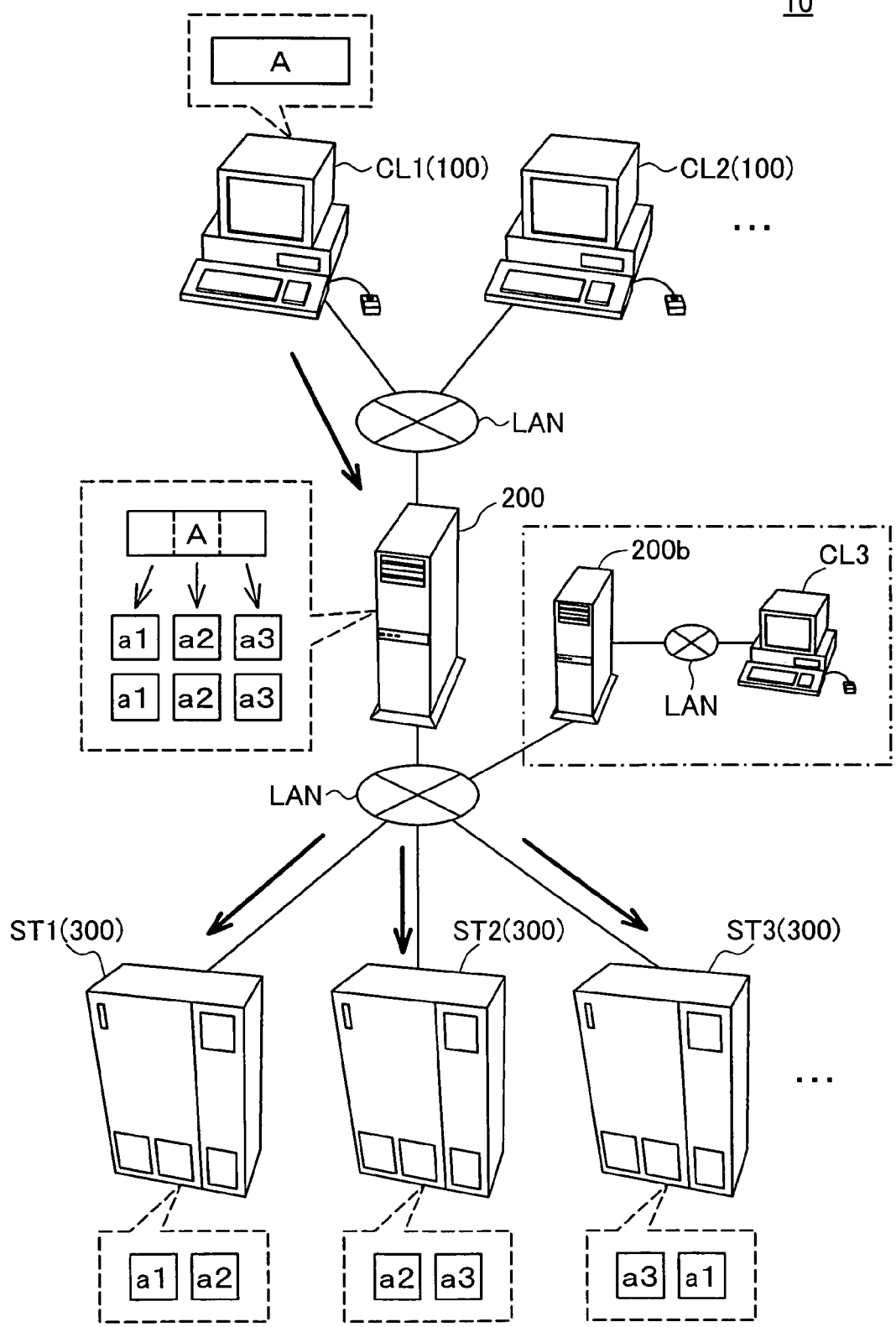
FIG. 1 is an illustration of a simplified arrangement for a file storing system.

A. Simplified Arrangement of File Storing System
B. Simplified Arrangement of File Input/Output Control Device
C. Simplified Arrangement of Storage Device
D. Various Processes
  (D1) Fragment Construction process
  (D2) Fragment Output Process
  (D3) File Reconstruction Process A. Simplified Arrangement of File Storing System FIG. 1 is an illustration of a simplified arrangement of a file storing system 10 by way of a working example. File storing system 10 is composed of clients CL1, CL2, a file input/output control device 200, and storage devices ST1, ST2, ST3. In the following description, clients CL1, CL2 are in some instances referred to generally as "clients 100" and storage devices ST1, ST2, ST3 generally as "storage devices 300." In FIG. 1, two clients 100 and three storage devices 300 are provided, but numbers of devices are not limited to these. Client CL3 and file input/output control device 200b, indicated by the dot-and-dash lines, will be described later.

Clients 100 and file input/output control device 200 are connected via a LAN. The file input/output control device 200 and storage device 300 are also connected via a LAN. These LANs may be the same LAN, or different LANs. A WAN that uses the Internet could be substituted for the LAN. Alternatively, the file input/output control device 200 and storage devices 300 may be connected via a storage area network (SAN).

Client 100 is a personal computer comprising a CPU, RAM, hard disk, and the like, and has the function of storing files on storage device 300 via file input/output control device 200. File storage is carried out as follows. When file input/output control device 200 inputs a file from a client 100, it constructs from the file a plurality of fragments depending on a predetermined number of divisions n and redundancy r. The fragments are then distributed to storage devices 300 on the basis of a predetermined rule. Storage devices 300 have large capacity disk units installed, and store the fragments output by the file input/output control device 200 on these disk units. That is, in the working example, a file output by a client 100 is divided into a number of fragments, which are then distributed to a plurality of storage devices for storage.

The system administration of the file storing system 10 sets up a number m (m is an integer) of storage devices 300, [the value of m] being determined from equation (1) below, using the aforementioned number of divisions n and redundancy r. In the working example, if there are fewer than m storage devices 300, it will not be possible to store all of the constructed fragments.

$$m \geq nr/(n-1) \qquad (1)$$

Here, let it be assumed for simplicity that in the file storage process by the file storing system 10, the number of file divisions n is 3, and the redundancy is 2. In this case, Equation (1) above gives a minimum of three storage devices 300 required. As illustrated, first, once a file "A" is output by client CL1, the file input/output control device 200 divides the file into three fragments a1, a2, a3, in accordance with the number of file divisions given above. The divided fragments are then replicated in accordance with the redundancy given above. In this way there are constructed, respectively, two fragments a1, two fragments a2, and two fragments a3. Next, on the basis of rules (A) (B) (C), the file input/output control device 200 distributes the fragments to storage devices 300.

(A) Distribution of a plurality of fragments to any single storage device is permitted.
(B) Fragments of the same type are not transmitted to a single storage device.
(C) Fragments of all types are not transmitted to a single storage device.

According to rule (A) above, storage of one or more fragments in a single storage device is permitted. However, if there are a large number of storage devices 300, there may be storage devices 300 in which no fragments are stored.

According to rule (B) above, fragments of different types may be stored on a single storage device 300. However, storing the combination of fragments a1, a1, a2 on a single storage device would not be permitted under this rule, since although differ types of fragments are stored, fragments of the same type would be stored.

According to rule (C) above, transmission of the combination of fragments a1, a2, a3, a1, for example, i.e. fragments of all types plus an additional fragment, would not be permitted.

Shown in the drawing is an example wherein, in accordance with these rules, fragments a1, a2 are distributed to storage device ST1, fragments a2, a3 are distributed to storage device ST2, and fragments a3, a1 are distributed to storage device ST3.

According to this file storing system 10, since in accordance with rule (A) a plurality of fragments can be stored on a single storage device, it becomes possible to store fragments with fewer storage devices 300 than in the past.

Furthermore, according to this file storing system 10, since in accordance with rule (B) fragments of the same type are distributed for storage on a plurality of storage devices 300, in the event of fault occurring in a number storage devices 300 less than the aforementioned redundancy, it will be possible to reconstruct the file using fragments stored on other storage devices 300.

For example, since the description herein assumes a redundancy of 2, let it be assumed that a smaller number, namely one, storage device 300 experiences a fault. Here, it is assumed that the fault occurs in storage device ST1. However, as shown in the drawing, fragments a1, a2 stored on storage device ST1 are also stored separately on the other devices, i.e. fragment a1 on storage device ST3 and fragment a2 on storage device ST2. Thus, even if a fault should occur in storage device ST1, it will nevertheless be possible to reconstruct the file using fragments stored on the other storage devices ST2, ST3. Accordingly, the fault tolerance of the system may be improved.

Furthermore, according to this file storing system 10, in accordance with rule (3), since fragments of all types are not transmitted to a single storage device 300, even if fragments should be stolen by from a single storage device 300 by means of cracking or the like, it will not be possible to reconstruct the file.

For example, let it be assumed that a malicious third party, using the client CL3 shown inside the dot-and-dash lines, improperly accesses data stored on storage device ST2, via a file input/output device 200b different from file input/output device 200. However, while fragment a2 and fragment a3 are stored on storage device ST2, fragment a1 is not stored there. Thus, it is not possible for the third party to acquire all of the fragments, so that the file cannot be reconstructed in its entirety. Accordingly, the security of the system can be enhanced.

Following is a detailed discussion of the devices making up the file storing system 10 and processes relating to file storage.

B. Simplified Arrangement of File Input/Output Control Device

Figure 2:
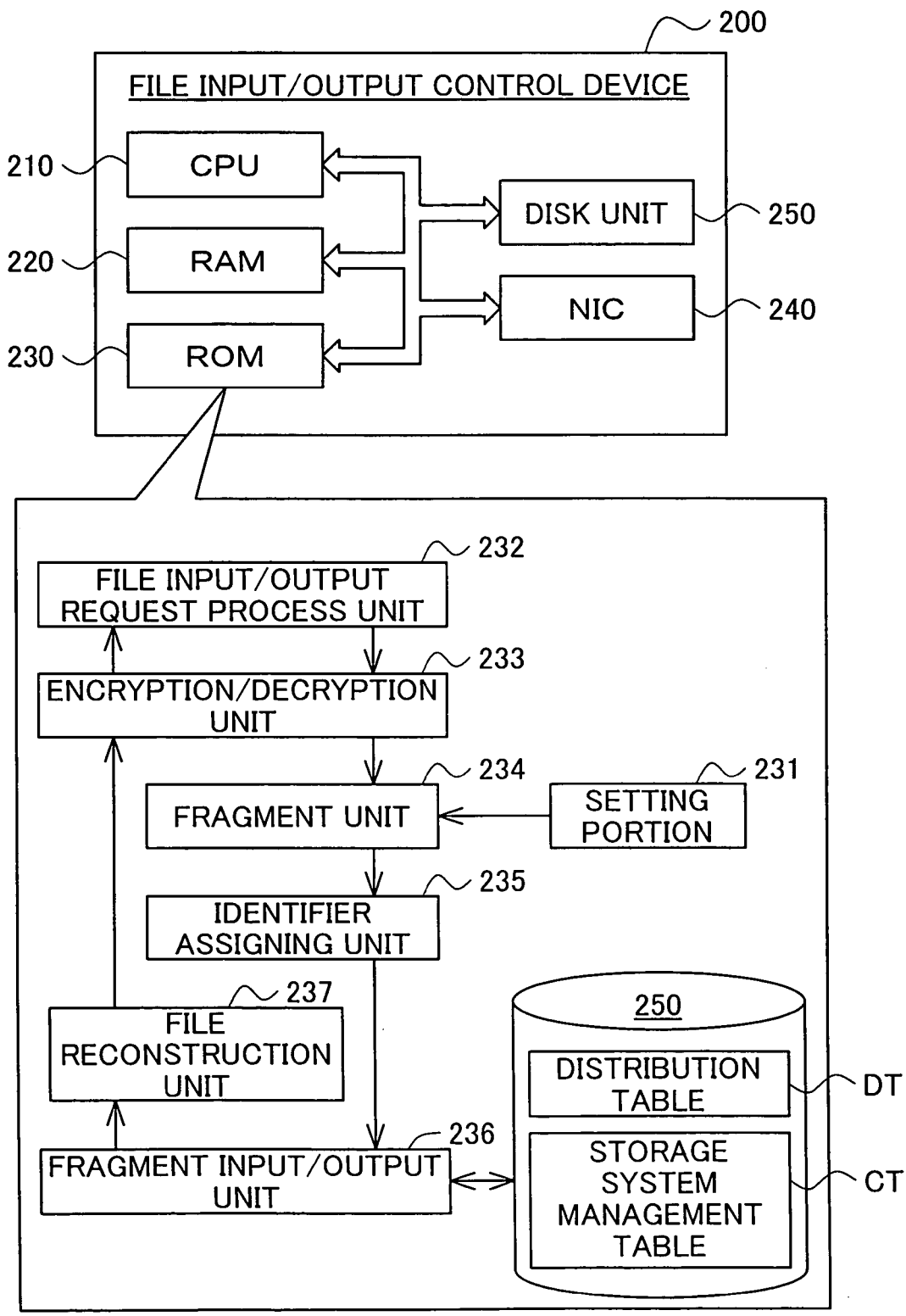
FIG. 2 is an illustration of a simplified arrangement for a file input/output control device.

FIG. 2 is an illustration of a simplified arrangement for a file input/output control device 200. File input/output control device 200 is constituted as a computer with a CPU 210, RAM 220, ROM 230, network interface controller (NIC) 240, disk unit 250 and the like, connected by a predetermined bus. NIC 240 is a controller for carrying out communication with other devices via a LAN.

A control program for controlling file input/output control device 200 is recorded in ROM 230. CPU 210 executes the control program by using RAM 220 as a work area. Alternatively, the control program could be installed on disk unit 250. At bottom in the drawing is shown a functional block diagram of the control program realized through software.

Setting portion 231 is a functional portion for receiving file division number and redundancy settings from the system administrator. Setting portion 231 also receives from the system administrator settings for a process to be carried out in the event that a file cannot be divided into fragments and stored. The set parameters are recorded in RAM.

FIG. 3 illustrates an exemplary GUI provided by setting portion 231. The GUI may be displayed on a CRT (not shown) connected to the file input/output control device 200, or on a client 100 via a Web browser. As illustrated, this GUI has a control unit for setting division number and redundancy, and a control unit for setting a process to be carried out in the event that a file cannot be divided into fragments and stored. Here, it is possible to select a process that, in the event that a file cannot be divided into fragments and stored, returns an error to the client, or that notifies the system administrator via e-mail that an undivided file has been stored, and could not be divided.

A file output request process unit 232 (FIG. 2) receives file input/output requests from clients 100. A file input request is a request by a client 100 to read out a file from a storage device 300; a file output request is a request by a client 100 to store a file on a storage device 300.

Encryption/decryption unit 233 performs encryption of files received from clients 100, and decryption of files sent to clients 100.

With reference to division number and redundancy set by setting portion 231, fragment unit 234 divides and replicates a file received from a client 100 to construct a plurality of fragments.

Identifier assigning unit 235 assigns a unique identifier to each fragment according to the type of fragment constructed by fragment unit 234. FIG. 4 illustrates the structure of a fragment assigned an identifier. As shown in the drawing, fragments ultimately output to storage devices 300 by file input/output control device 200 have a structure composed of a fragment identifier, and data proper.

Fragment input/output unit 236 (FIG. 2) performs input/output of fragments to and from storage devices 300. Fragment output is carried out in accordance with rules (A) (B) (C) described earlier. These rules are incorporated into the program for the fragment input/output unit.

File reconstruction unit 237, in the event of a file input request from a client 100, collects the fragments from the storage devices 300 and performs reconstruction of the file. The reconstructed file is decoded by the encryption/decryption unit 233, and output to the client 100.

Disk unit 250 holds a distribution table DT and a storage system management table CT. FIG. 5 illustrates an exemplary storage system management table. Fragment input/output unit 236 makes reference to the storage system management table CT when selecting output destination for each fragment. Additionally, fragment input/output unit 236, upon outputting a fragment to a storage device 300, updates the storage system management table CT, to record which fragments have been output to which storage devices 300.

FIG. 6 illustrates an exemplary distribution table DT. When outputting each fragment to a storage device 300, fragment input/output unit 236 updates the distribution table DT, to record which fragments have been output to which storage devices 300. In the distribution table DT are recorded in associated form a file identifier for identifying a file input from a client 100, an identifier for each of the fragments making up the file, and a storage device 300 identifying name that indicates the distribution of each fragment.

C. Simplified Arrangement of Storage Device

Figure 7:
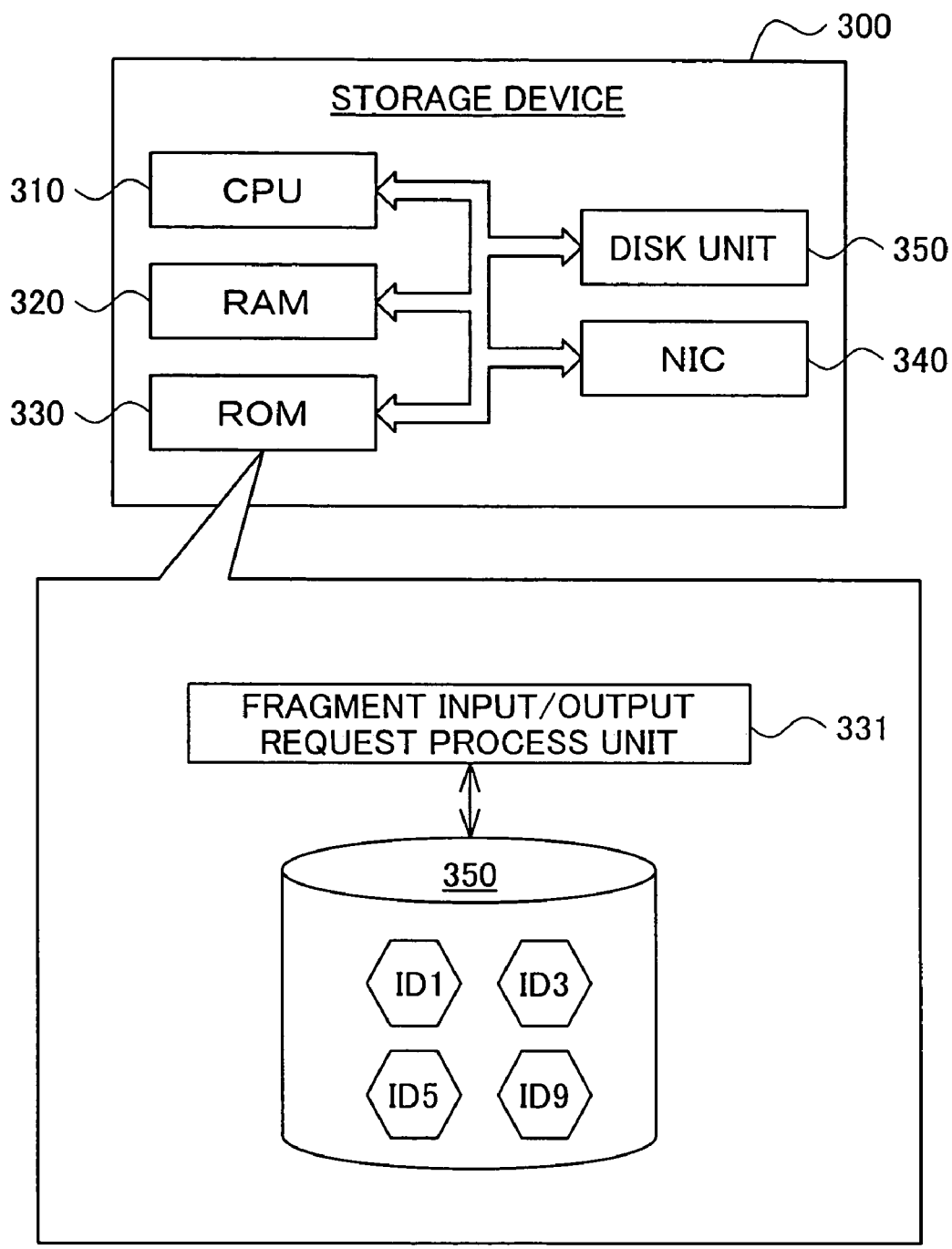
FIG. 7 is an illustration of a simplified arrangement for a storage device.

FIG. 7 is an illustration of a simplified arrangement for a storage device. Storage device 300 is constituted as computer comprising a CPU 310, RAM 320, ROM 330, network interface controller (NIC) 340, high capacity disk unit 350 and the like, connected by a predetermined bus.

A control program for controlling storage device 300 is recorded in ROM 330. CPU 310 executes the control program by using RAM 320 as a work area. Alternatively, the control program could be installed on disk unit 350. The fragment input/output request process unit 331 shown at bottom in the drawing is a functional unit realized through software, by means of the control program.

Fragment input/output request process unit 331 has the function of storing fragments output by file input/output control device 200 on disk unit 350, and of reading out fragments from disk unit 350, for output to file input/output control device 200.

D. Various Processes

(D1) Fragment Construction Process

Figure 8:
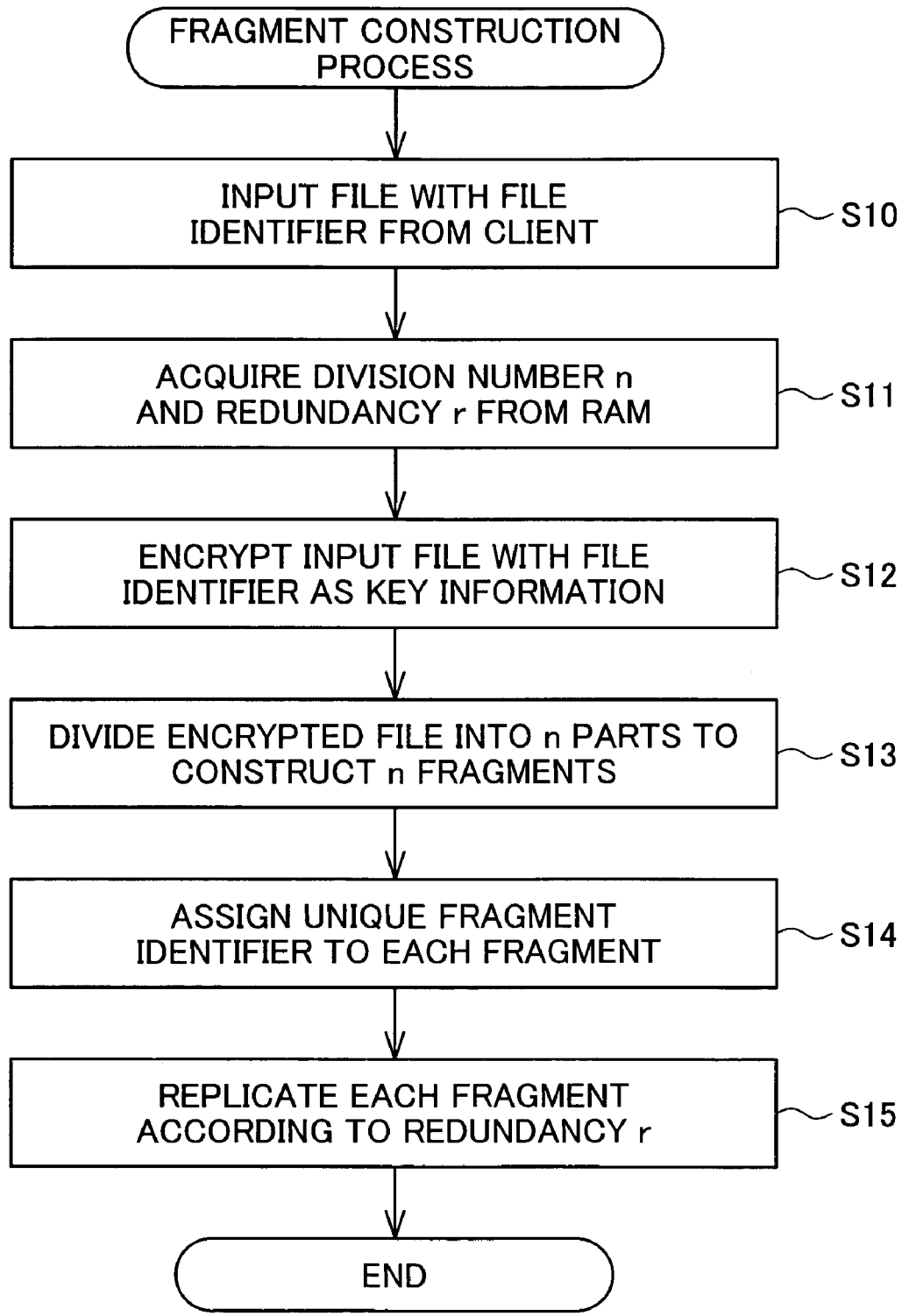
FIG. 8 is a flow chart of a fragment construction process.

FIG. 8 is a flow chart of a fragment construction process executed by CPU 210 of file input/output control device 200. This fragment construction process is a process executed when file input/output control device 200 receives a file output request from a client 100.

When CPU 210 inputs a file output request from a client 100 as well as a file assigned a file identifier (Step S10), it acquires from RAM 220 the division number and redundancy set by setting portion 231 (Step S11). CPU 210 then encrypts the file by means of DES, using as key information the file identifier input in Step S10 (Step S12). While DES is used as the encryption scheme in the working example, any of various other encryption schemes, such as Triple DES, RC2, RC4 or the like could be used instead.

The aforementioned file identifier may be uniquely generated by the client 100, or the file input/output control device 200 may generate it by linking the IP address of the client 100 outputting the file with the file name of the input file. Where the identifier is generated by the file input/output control device 200, it becomes a simple matter to generate unique identifiers in the file saving system 10.

Next, with reference to the division number n acquired in Step S11, CPU 210 divides the encrypted file into n parts to construct n fragments (Step S13). CPU 210 then assigns each constructed fragment a unique fragment identifier (Step S14). Fragment identifiers can be generated, for example, by linking the aforementioned file identifier with a number representing the order in which fragments were divided. By so doing, CPU 210 can assign a unique identifier to each fragment in the file saving system 10.

Finally, with reference to the redundancy r acquired in Step S11, CPU 210 replicates each fragment that has been assigned a fragment identifier (Step S15). By means of the above process, the fragment construction process terminates. In Step S12 described hereinabove, file encryption was carried out prior to fragment construction; however, it would be acceptable instead to perform encryption on each fragment after fragments have been constructed.

(D2) Fragment Output Process

Figure 9:
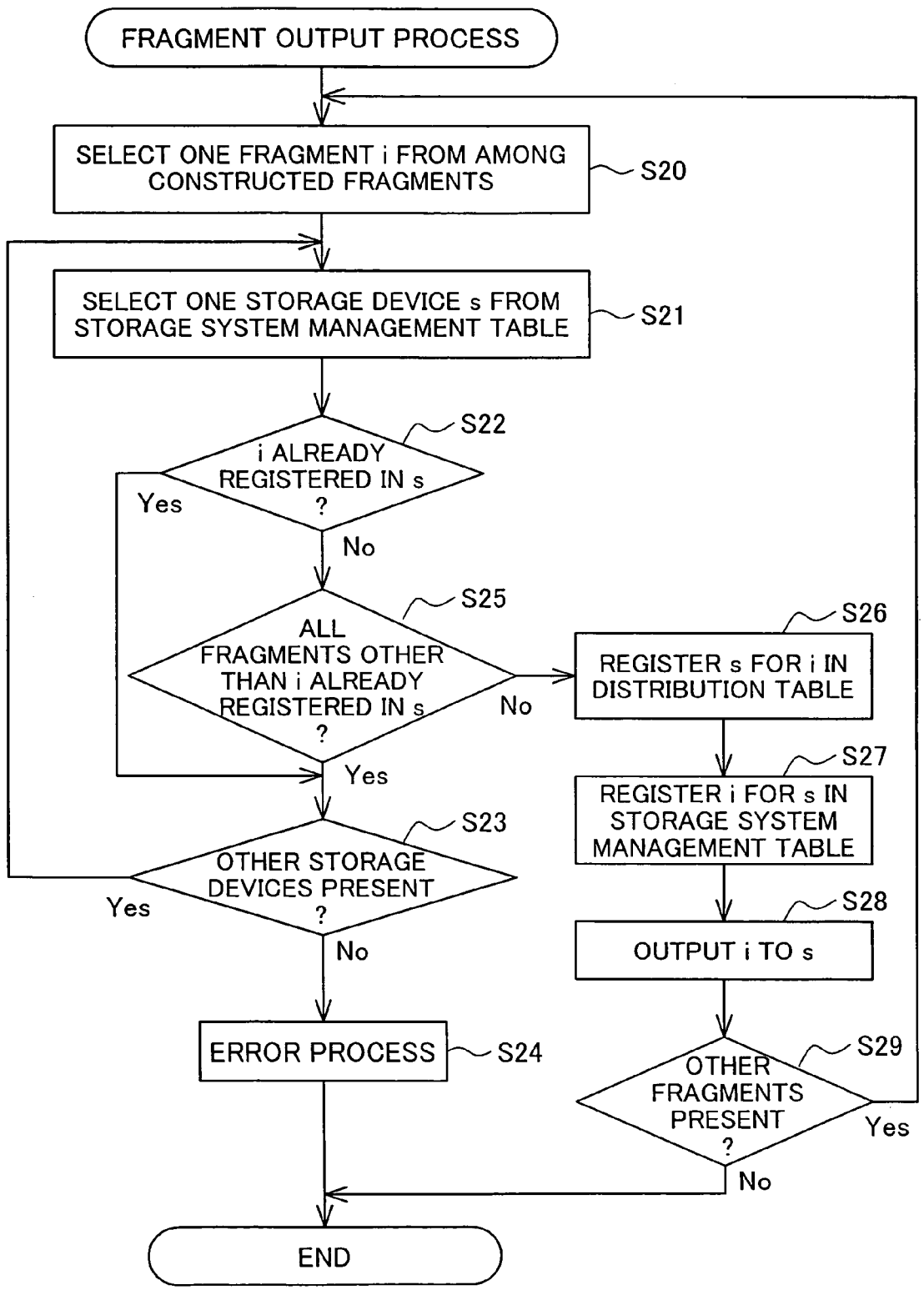
FIG. 9 is a flow chart of a fragment output process.

FIG. 9 is a flow chart of a fragment output process executed by CPU 210 of file input/output control device 200. This fragment output process is a process executed after fragments have been constructed by the fragment construction process described above.

First, CPU 210 selects one fragment from among the constructed fragments, according to the numerical order of the fragment identifiers (Step S20). In the description hereinbelow, this selected fragment shall be denoted by "i". CPU 210 also selects one storage device 300, making reference to the storage system management table CT (Step S21). In the description hereinbelow, this selected storage device 300 shall be denoted by "s". In this process, CPU 210 can, for example, select storage device s in the order of decreasing number of fragments recorded in storage system management table CT.

Next, CPU 210, making reference to storage system management table CT, queries whether fragment i was previously stored in storage device s. In the event that the query shows it to be already stored (Step S22: Yes), CPU 210, in order to avoid duplicate output of the same type of fragment to a single storage device s, queries whether another storage device 300 is registered in the storage system management table CT (Step S23). If the query shows one to be registered (Step S23: Yes), CPU 210 returns to the process of Step S21 and selects the next storage device 300. If the query shows that no other storage device 300 is registered in the storage system management table CT (Step S23: No), since not all of the constructed fragments can be stored, CPU 210 executes the error process that has been set by the setting portion 231 (Step S24) and terminates the fragment output process.

In Step S22 described above, in the event that the query indicates that fragment i is not registered in storage device (Step S22: No), CPU 210 then makes reference to storage system management table CT to query whether fragments of all types other than fragment i are stored in storage device s (Step S25). If the query shows that fragments of all types other than fragment i are already stored in storage device s (Step S25: Yes), since CPU 210 cannot output fragments of all types to any one storage device s, it queries whether another storage device 300 is registered in the storage system management table CT (Step S23). If the query shows that another storage device 300 is registered (Step S23: Yes), CPU 210 returns to the process of Step S21 and selects the next storage device 300. If the query shows that no other storage device 300 is registered in the storage system management table CT (Step S23: No), since not all of the constructed fragments can be stored, CPU 210 executes the error process that has been set by the setting portion 231 (Step S24) and terminates the fragment output process.

In Step S25 described above, in the event that the query indicates that fragments of all types other than fragment i not stored in storage device s (Step S25: No), CPU 210 registers the identifying name of storage device s for fragment i in distribution table DT (Step S26), and registers the identifier of fragment i for storage device s in storage system management table CT (Step S27). It then outputs fragment i to storage device s (Step S28).

Once CPU 210 has output fragment i to storage device s, it determines whether there is any other fragment that has not yet been output (Step S29). In the event that there is another fragment (Step S29: Yes), the routine returns to the aforementioned Step S20, and the next fragment is selected. If there is no other fragment (Step S29: No), all fragments have been output, and therefore the fragment output process terminates.

According to the fragment output process described above, file input/output control device 200 is able to carry out distribution of fragments on the basis of the aforementioned rules (A) (B) (C).

(D3) File Reconstruction Process

Figure 10:
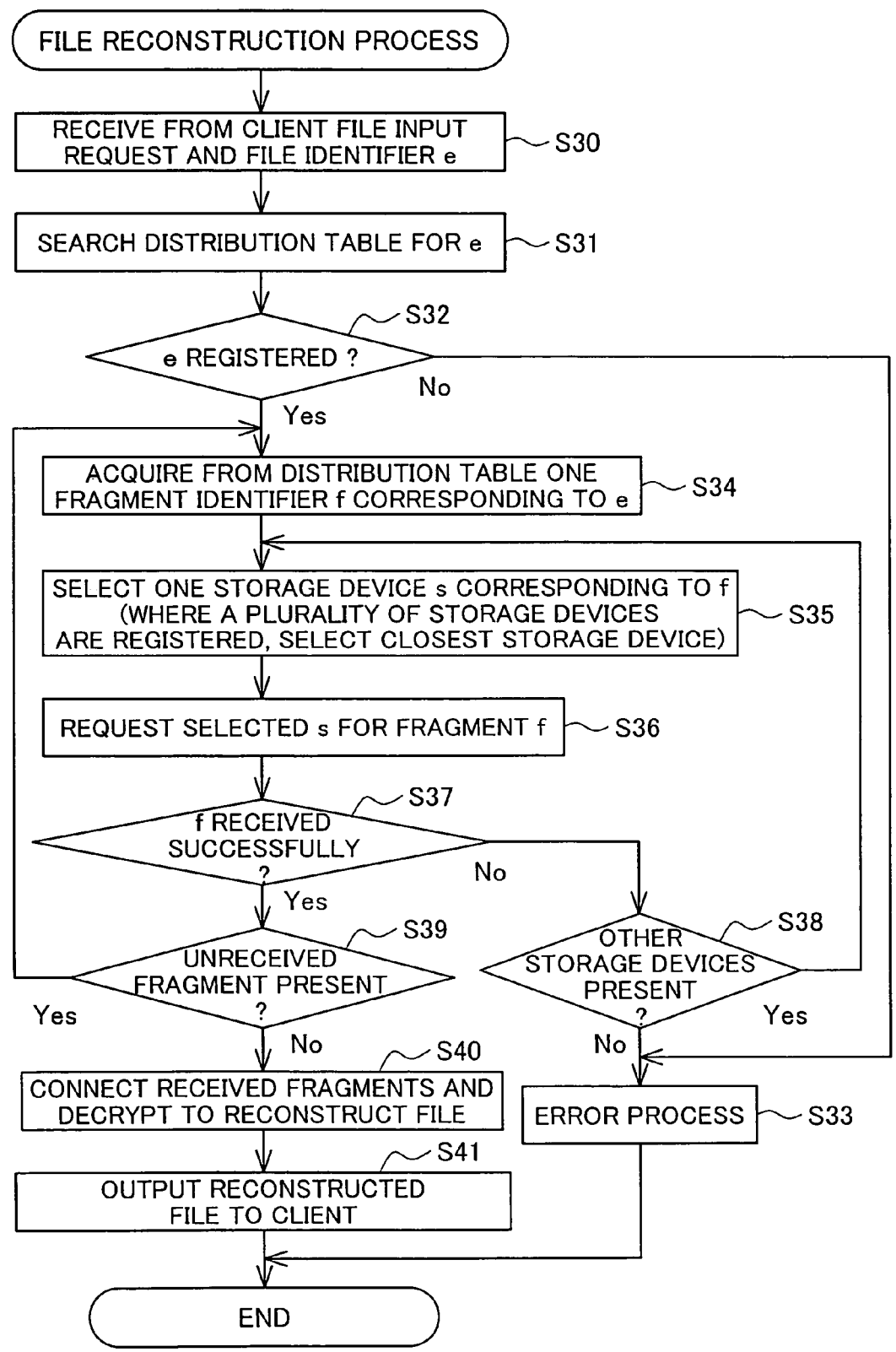
FIG. 10 is a flow chart of a file reconstruction process.

FIG. 10 is a flow chart of a file reconstruction process executed by CPU 210 of file input/output control device 200. This file reconstruction process is a process executed in the event that a file input request is received from a client 100.

First, when CPU 210 receives a file input request together with a file identifier (here, the file identifier shall be designated as "e") from a client 100 (Step S30), it refers to distribution table DT to search for file identifier e (Step S31).

If as a result of this search, file identifier e is not found to be registered in distribution table DT (Step S32: No), CPU 210 transmits to client 100 an error message to the effect that the request file cannot be found (Step S33), and terminates the file reconstruction process. On the other hand, if file identifier e is registered in distribution table DT (Step S32: Yes), acquires one fragment identifier (hereinbelow, this fragment identifier shall be designated as "f") corresponding to file identifier e, in the order of registration in the distribution table DT (Step S34).

Next, CPU 210 selects from the distribution table DT one storage device 300 corresponding to fragment identifier f (Step S35). In the event that a plurality of storage devices 300 are registered, the storage device 300 having the shortest transmission time to the file input/output control device 200 is selected.

In Step S35 above, CPU 210 may ascertain response speed of each storage device 300, for example, by issuing a "Ping" command to each storage device 300, and selecting the storage device 300 with the fastest response speed. Or, CPU 210 may ascertain the number of intervening routers on the LAN by issuing a "Tracert" command or "Traceroute" command or the like to each storage device 300, and selects the storage device 300 with the fewest number of intervening routers. Alternatively, time required for communication with each storage device 300 may be recorded in advance in the storage system management table CT or distribution table DT, with CPU 210 referring to these times when selecting a storage device 300.

Next, CPU 210 requests the storage device s selected in Step S35 above to output the fragment assigned the fragment identifier f (Step S36). Storage device s, in response to the request, outputs fragment f to file input/output control device 200.

Next, CPU 210 determines whether fragment f has been received successfully (Step S37). If, due to a fault occurring on the storage device s selected in Step S35 or some other reason, fragment f fails to be received (Step S37: No), CPU 210 refers to the distribution table DT to query whether other storage devices 300 having fragment f stored thereon are registered (Step S38). If the query shows that the fragment is registered on other storage devices 300 (Step S38: Yes), CPU 210 returns to Step S35, and selects one storage device 300 from among the other storage devices 300. On the other hand, the query shows that the fragment is not registered on any other storage devices 300 (Step S38: No), since CPU 210 cannot acquire fragment f, making it impossible to reconstruct the file, it sends to the client 100 an error message to the effect that file reconstruction has failed (Step S33), and terminates the file reconstruction process.

In the event that fragment f is received successfully in response to the fragment f output request in Step S36 above (Step S37: Yes), CPU 210 determines whether there is any fragment yet to be received (Step S39). If there is any fragment that has not yet been received (Step S39: Yes), CPU 210 returns to the process of Step S34, to acquire all remaining fragments.

In the event that all fragments have been received (Step S39: No), CPU 210 strips the fragment identifier from each received fragment and joins the fragments together, and also performs decryption using as key information the file identifier input in Step S30, in order to reconstruct the file (Step S40). Finally, CPU 210 sends the reconstructed file to the client 100 (Step S41).

In the file reconstruction process described above, in Step S35, it would be acceptable, for example, to select storage devices 300 so as to minimize as much as possible the number of storage devices 300 requesting fragment output. By so doing, the increase in network traffic can be held to a minimum.

The invention has been shown and described hereinabove through a working example. According to the file input/output control device 200 of the working example, system security and fault tolerance can be assured, while making it possible to divide and store files with fewer storage devices 300 than in the past. Once the file input/output control device has encrypted a file, it then divides the encrypted file to construct fragments. Here, when the file input/output control device 200 is encrypting the file, there may be employed an encryption scheme wherein decryption is not possible unless all of the file data is collected. Where such an encryption scheme is employed, even in the event that a storage device were accessed without authorization, since the unauthorized intruder cannot acquire from the improperly accessed storage device all of the fragments needed to reconstruct the file, it will not be possible to decrypt the entire file, nor will it be possible to decrypt even the acquired fragments, thereby enhancing system security.

The invention is not limited to the working example described above, various modifications thereof being possible without departing from the scope and spirit of the invention. For example, function realized through software could instead be realized through hardware. Finally, the present application claims the priority based on Japanese Patent Application No. 2004-018112 filed on Jan. 27, 2004, which is herein incorporated by reference.

What is claimed is:

1. A file input/output control device for controlling input/output of a file to and from a plurality of storage devices, the file input/output control device comprising:
   an information transmission unit that connects said storage devices;
   a fragment unit for constructing a plurality of fragments from said file according to a predetermined number of divisions n (n is an integer $\geq 2$) such that the fragments are derived by dividing said file into n fragments having predetermined redundancy r (r is an integer $\geq 2$), said n fragments including fragments of different types; and
   a fragment output unit for outputting the constructed fragments to m (m is an integer $\geq 2$) of said storage devices, in such a way as to store at least one group having a plurality of fragments of any type in one storage device, while not storing fragments of the same type on any one storage device, and while not storing fragments of all types on any one storage device,
   wherein each fragment is assigned a unique fragment identifier which is different from the fragment identifiers of the other fragments, said unique fragment identifier uniquely identifies said fragment to which it is assigned relative to the other fragments based on a type of said fragment.

2. A file input/output control device according to claim 1, wherein said fragment output unit outputs said fragments to a number m (m is an integer) of storage devices fulfilling the relationship:

$$m > nr/(n-1).$$

3. A file input/output control device according to claim 1, the file input/output control device further comprising:
   an identifier assigning unit for assigning to each said fragment a unique fragment identifier depending on the type of said fragment; and
   a distribution memory unit for storing said fragment identifier, in association with the storage device which is the destination of the fragment corresponding to said fragment identifier.

4. A file input/output control device according to claim 3, wherein said fragment input unit, in the event of being unable to input one fragment, makes reference to said distribution memory unit to input said one fragment from another storage device having said one fragment stored therein.

5. A file input/output control device according to claim 4, wherein said fragment input unit, in the event of being unable to input one fragment, makes reference to said distribution memory unit to input said one fragment from another storage device having said one fragment stored therein.

6. A file input/output control device according to claim 1, the file input/output control device further comprising an encryption unit for performing encryption of said file prior to geeration of said fragments by said fragment unit.

7. A file input/output control device according to claim 1, the file input/output control device further comprising an encryption unit for performing encryption of said fragments.

8. A file input/output control device according to claim 1, wherein said file is given a file identifier, and the file input/output control device further comprise an encryption unit that uses said file identifier as key information to perform encryption of at least one of said file and said fragments.

9. A file input/output control device for controlling input/output of a file to and from a plurality of storage devices, the file input/output control device comprising:
   an information transmission unit that connects said storage devices;
   a fragment unit for constructing a plurality of fragments from said file according to a predetermined number of divisions n (n is an integer $\geq 2$) such that the fragments are derived by dividing said file into n fragments having a predetermined redundancy r (r is an integer $\geq 2$), said n fragments including fragments of different types;
   a fragment output unit for outputting the constructed fragments to m (m is an integer $\geq 2$) of said storage devices, in such a way as to store at least one group having a plurality of fragments of any type in one storage device, while not storing fragments of the same type on any one storage device, and while not storing fragments of all types on any one storage device;
   a fragment input unit for inputting fragments of all types from said storage devices; and
   a file reconstruction unit for reconstructing said file from said fragments of all types,
   wherein seid fragment input unit inputs said fragment from the storage device storing a fragment of the same type and having the shortest transmission time to said file input/output control device.

10. A method for a computer to control input/output of a file to and from a plurality of storage devices, said method comprising:
    connecting said storage devices by a predetermined information transmission unit;
    constructing a plurality of fragments from said file according to a predetermined number of divisions n (n is an integer $\geq 2$) such that the fragments are derived by dividing said file into n fragments having a predetermined redundancy r (r is an integer $\geq 2$), said n fragments including fragments of different types; and
    outputting the constructed fragments to m (m is an integer $\geq 2$) of said storage devices, in such a way as to store at least one group having a plurality of fragments of any type in one storage device while not storing fragments of the same type on any one storage device, and while not storing fragments of all types on any one storage device,
    wherein each fragment is assigned a unique fragment identifier which is different from the fragment identifiers of the other fragments, said unique fragment identifier uniquely identifies said fragments to which it is assigned relative to the other fragments based on a type of said fragment.

11. A program stored on a storage medium, for controlling input/output of a file to and from a plurality of storage devices connected by a predetermined information transmission system, said program when executed causes a computer to perform;
    a first function of constructing a plurality of fragments from said file according to a predetermined number of divisions n (n is an integer $\geq 2$) such that the fragments are derived by dividing said file into n fragments having a predetermined redundancy r (r is an integer $\geq 2$), said n fragments including fragments of different types; and
    a second function of outputting the constructed fragments to m (m is an integer $\geq 2$) of said storage devices, in such a way as to store at least one group having a plurality of fragments of any type in. one storage device, while not storing fragments of the same type on any one storage device, and while not storing fragments of all types on any one storage device,
    wherein each fragment is assigned a unique fragment identifier which is different from the fragment identifiers of the other fragments, said unique fragment identifier uniquely identifies said fragments which it is assigned relative to the other fragments based on a type of said fragment.

* * * * *